US008347033B2

(12) United States Patent
Zimoto et al.

(10) Patent No.: US 8,347,033 B2
(45) Date of Patent: Jan. 1, 2013

(54) STORAGE SYSTEM HAVING POWER SAVING FUNCTION

(75) Inventors: Yoshifumi Zimoto, Odawara (JP); Kenji Muraoka, Odawara (JP); Ikuya Yagisawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 292 days.

(21) Appl. No.: 12/669,465

(22) PCT Filed: Dec. 1, 2009

(86) PCT No.: PCT/JP2009/006504
§ 371 (c)(1),
(2), (4) Date: Jan. 15, 2010

(87) PCT Pub. No.: WO2011/067806
PCT Pub. Date: Jun. 9, 2011

(65) Prior Publication Data
US 2011/0271049 A1    Nov. 3, 2011

(51) Int. Cl.
*G06F 12/08*    (2006.01)
*G06F 1/32*    (2006.01)
(52) U.S. Cl. ............................... 711/114; 711/E12.019
(58) Field of Classification Search ................... 711/113, 711/114, E12.019
See application file for complete search history.

(56) References Cited

U.S. PATENT DOCUMENTS

| 2006/0253650 | A1* | 11/2006 | Forrer et al. | 711/113 |
| 2007/0033341 | A1* | 2/2007 | Hashimoto et al. | 711/113 |
| 2007/0067560 | A1* | 3/2007 | Anzai et al. | 711/112 |
| 2007/0162692 | A1 | 7/2007 | Nishimoto et al. | |
| 2007/0260815 | A1* | 11/2007 | Guha et al. | 711/114 |
| 2010/0122050 | A1* | 5/2010 | Hutchison et al. | 711/162 |
| 2010/0199036 | A1* | 8/2010 | Siewert et al. | 711/112 |
| 2011/0035605 | A1* | 2/2011 | McKean et al. | 713/300 |

FOREIGN PATENT DOCUMENTS

| GB | 2 411 269 A | 8/2005 |
| JP | 2006-302300 | 11/2006 |

OTHER PUBLICATIONS

PCT International Search Report on International Application No. PCT/JP2009/006504 dated Jul. 19, 2010; 3 pages.

* cited by examiner

*Primary Examiner* — Charles Rones
(74) *Attorney, Agent, or Firm* — Foley & Lardner LLP

(57) ABSTRACT

A data element that is identical to a part of a plurality of data elements stored in a logical storage device (LU hereinbelow) is stored in a storage area (pool hereinbelow) separate from the LU. A first PDEV (physical storage device) that stores the data element stored in the LU may be placed in a power saving state while the storage system is operating (in periods when a read command can be received), and a second PDEV which stores the data element stored in the pool is not placed in a power saving state during operation. When the storage system receives a read command which is received from the host apparatus, and if the first PDEV is in the power saving state and a data element identical to the data element which is the target of the read command is stored in the pool, the storage system reads the identical data element from the pool without canceling the power saving state of the first PDEV, and sends the read data element to the host apparatus.

18 Claims, 7 Drawing Sheets

| L.U. | PRIORITY LEVEL | POWER SAVING FLAG | READ DATE AND TIME | LBA | SIZE | DATA |
|---|---|---|---|---|---|---|
| 2 | HIGH | PRESENT | 2009/11/1/11 12/00 | 0x000023d0 | 0x0200 | 00 ... |
| 2 | HIGH | PRESENT | 2009/11/2/11 12/11 | 0x002033d0 | 0x0250 | 00 ... |
| 2 | MEDIUM | PRESENT | 2009/11/2/11 12/09 | 0x002003d0 | 0x0250 | 00 ... |
| 2 | LOW | NONE | 2009/11/3/11 11/09 | 0x004023d0 | 0x015 | 00 ... |
| 2 | LOW | NONE | 2009/11/3/11 11/55 | 0x0043250 | 0x020 | 00 ... |

Rows 1–3: POWER SAVING POOL AREA GROUP
Rows 4–5: OPERATING POOL AREA GROUP

FIG. 6

| L.U. | PRIORITY LEVEL | POWER SAVING FLAG | READ DATE AND TIME | LBA | SIZE |
|---|---|---|---|---|---|
| 2 | HIGH | PRESENT | 2009/11/11/11 12/00 | 0x000023d0 | 0x0200 |
| 2 | HIGH | PRESENT | 2009/11/2/11 12/11 | 0x002033d0 | 0x0250 |
| 2 | MEDIUM | PRESENT | 2009/11/2/11 12/09 | 0x002003d0 | 0x0250 |
| 2 | LOW | NONE | 2009/11/3/11 11/09 | 0x004023d0 | 0x015 |
| 2 | LOW | NONE | 2009/11/3/11 11/55 | 0x0043250 | 0x020 |

.........

160

SETTING METHOD
● AUTOMATIC
○ MANUAL
○ CLEAR

STORAGE SYSTEM HAVING POWER SAVING FUNCTION

CROSS-REFERENCE TO RELATED APPLICATION

This application is the National Phase of International Patent Application No. PCT/JP2009/006504, filed on Dec. 1, 2009. The contents of this application is incorporated herein by reference in its entirety.

TECHNICAL FIELD

This invention relates to power savings of a storage system.

BACKGROUND ART

As a storage system that has a power saving function, a disk array device that is disclosed in Patent Literature 1, for example, is known. This disk array device controls power savings of magnetic disk devices of the disk array device.

CITATION LIST

Patent Literature

[PTL 1]
Japanese Patent Application Laid-open No. 2006-302300.

SUMMARY OF INVENTION

Technical Problem

When the power state of a magnetic disk device has entered an operating state (non-power saving state), the disk of the magnetic disk device turns at a high speed, thereby enabling reading and writing of data from/to the disk. When the magnetic disk device is in a power saving state, the rotational speed of the disk is zero or a low speed.

In a case where the disk array device receives an I/O (Input/Output) command from a host apparatus, data is read and written from/to the magnetic disk device on the basis of this I/O command. If the magnetic disk device which is the I/O target is in the power saving state, the disk array device spins up the disk of the magnetic disk device (that is, cancels the power saving state of the magnetic disk device) in order to read and write data from/to the magnetic disk device.

In the host apparatus, an application program (hereinafter "AP") is run on an OS (Operating System) or middleware in the host apparatus. Typically, a read command to acquire data desired by the user of the AP is issued to the storage system from the host apparatus by executing the AP, but the event triggering the issuing of the read command is not limited to the acquisition of data desired by the user of the AP (hereinafter "AP task"). Further such events include those in (1) to (3) below, for example.

(1) OS reboot. A read command designating an LU (Logical Unit) recognized by the OS during an OS reboot is issued by the OS.
(2) Device re-scan by OS or middleware. A device re-scan checks recognizable LU without rebooting the OS. A read command designating an LU that the OS or middleware recognizes in the device re-scan is issued by the OS or middleware.
(3) Health check by the OS or middleware. A health check checks whether a path (or LU) is normal at regular intervals (once every hour, for example). At each check, a read command designating an LU linked to the path is issued by the OS or middleware.

Typically, a storage system includes a plurality of RAID (Redundant Array of Independent (or Inexpensive) Disks) groups, each RAID group comprising a plurality of magnetic disk devices, reading and writing of data in accordance with an I/O command designating LU are performed in RAID group units depending on the RAID level. Hence, in a case where a read command to read data stored in a storage area that is based on magnetic disk devices in a power saving state (hereinafter "power saving area") is received, the power saving state magnetic disk devices must then be spun up in RAID group units. In the case of (3) above in particular, a read command is issued to each LU at regular intervals, thereby generating a need to spin up the magnetic disk devices at regular intervals in RAID group units.

As described earlier, a read command to read data that is stored in a power saving area may also be issued on the occasion of an event other than an AP task. On each such occasion, when the magnetic disk devices on which the power saving area is based are spun up, the power saving effect of the storage system is diminished.

Note that, as a method for preventing a diminished power saving effect, a method may be considered in which, in a case where a storage system receives a read command to read data stored in a power saving area, for example, the storage system sends back a predetermined response (a response (Not Ready response) signifying that an LU has not yet been prepared, for example) to the host apparatus without spinning up the magnetic disk devices on which the power saving area is based. However, this method is considered to be undesirable since the LU designated by the read command is likely to be identified as abnormal by the OS or middleware.

The above problem may also arise when a physical storage device is a device other than a magnetic disk device.

It is therefore an object of the present invention to reduce the frequency with which the power saving state of a physical storage device is canceled.

Solution to Problem

A data element identical to a part of a plurality of data elements that are stored in a logical storage device (hereinafter "LU") is stored in a different storage area ("pool" hereinafter) from the LU. A first PDEV (physical storage device), which stores the data element stored in the LU, is placed in a power saving state while the storage system is operating (in periods when read commands can be received), and a second PDEV, which stores the data element stored in the pool, is not placed in a power saving state while the storage system is operating. If, when the storage system receives a read command which is received from the host apparatus, the first PDEV is in the power saving state and a data element identical to the data element which is the target of the read command is stored in the pool, the storage system reads the identical data element from the pool without canceling the power saving state of the first PDEV, and sends the read data element to the host apparatus.

The host apparatus is typically a computer (server apparatus, for example) but may be another storage system instead of a computer.

Advantageous Effects of Invention

The PDEV may be any storage device such as a hard disk drive or a flash memory. The first PDEV is ideally a PDEV that a RAID group comprises. The second PDEV may be a PDEV that a RAID group comprises or another type of involatile storage device (memory, for example) that a RAID group does not comprise.

BRIEF DESCRIPTION OF DRAWINGS

FIG. 5 shows a composition of mapping information 152 (power saving pool 125P).

FIG. 6 shows a settings screen 160 of the mapping information 152.

DESCRIPTION OF EMBODIMENTS

A storage system according to an embodiment of the present invention will be described hereinbelow with reference to the drawings. Note that, in the following description, processing that is performed by a program is actually carried out by a CPU that executes the program.

Figure 1:
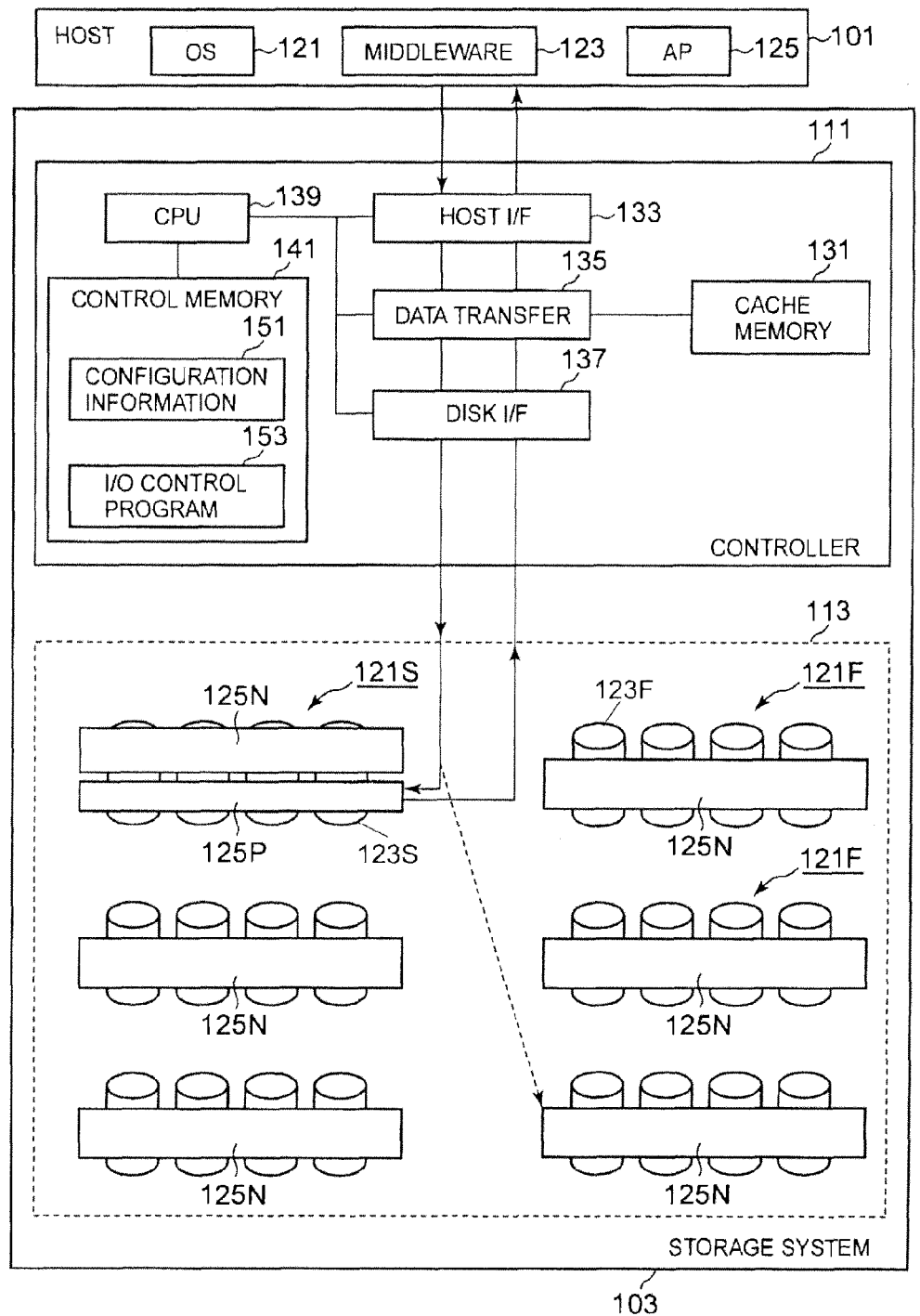
FIG. 1 shows a configuration of a storage system according to an embodiment of the present invention.

FIG. 1 shows a configuration of the storage system according to an embodiment of the present invention.

A host apparatus 101 is coupled to a storage system 103. The storage system 103 includes a HDD (Hard Disk Drive) group 113, and a controller 111 that is connected to the HDD group 113 and which receives I/O commands (write or read commands) from the host apparatus 101.

An OS (Operating System) 151, middleware 153, and an application program (AP) 155 are executed by the CPU (Central Processing Unit), not shown, of the host apparatus 101. The AP 155 runs on the OS 151 or middleware 153. The AP 155 issues an I/O command in response to a task of the APP 155 (in response to a request from the user of the AP 155, for example). The OS 151 and/or middleware 153 receives the issued I/O command, and the I/O command is sent to the storage system 103 from the OS 151 and/or middleware 153 based on this command. The I/O command sent from the host apparatus 101 to the storage system 103 includes information indicating an access-destination logical area ("access-destination information" hereinbelow) such as a LUN (Logical Unit Number) and an LBA (Logical Block Address).

The HDD group 113 configures a plurality of RAID groups (Redundant Array of Independent (or Inexpensive) Disks). Each of the RAID groups comprises two or more HDD, and each HDD is connected to a disk I/F 137. Instead of a HDD, another type of physical storage device such as a DVD (Digital Versatile Disk) drive or flash memory, for example, may be adopted.

One or more LU (Logical Units) are formed based on the storage space of two or more HDD of a RAID group. An LU comprises a plurality of logical areas (logical storage areas, for example blocks). Data stored in one logical area will be referred to hereinbelow as a "data element". Data elements stored in the LU are stored, according to the RAID level of the RAID group, in the RAID group on which the LU is based.

The plurality of RAID groups include a first RAID group 121F and a second RAID group 121S. In the present embodiment, there exist a plurality of the first RAID groups 121F and a single second RAID group 121S. Hereinafter, a HDD 123F of the first RAID groups 121F will be called the "first HDD 123F", while a HDD 123S of the second RAID group 121S will be called the "second HDD 123S".

The first RAID group 121F is a RAID group based on an LU (normal LU hereinbelow) 125N which stores data that is read and written in tasks of the AP155. In the present embodiment, a LUN of the normal LU 125N is included in access destination information of an I/O command from the host apparatus 101. However, the LUN is not limited to being included in the access destination information. A logical area group that includes a normal LU 125N may be configured, and the LUN of a virtual LU (Thin Provisioning virtual LU) (not shown) that is associated with the logical area group may be included in the access destination information of the I/O command from the host apparatus 101. In this case, an unassigned logical area in the logical area group is assigned to a virtual area indicated by the access destination information of a write command (virtual area of a plurality of virtual areas forming the virtual LU), and a data element that is associated with the write command is stored in the assigned logical area.

In the present embodiment, the first HDD 123F is shifted between a power saving state and a non-power saving state ("operating state" hereinbelow) in first RAID group 121F units in periods when the controller 111 is capable of receiving I/O commands (while the storage system 103 is operating). In a case where the first HDD 123F is in a power saving state, the rotational speed of the disk in the first HDD 123F is a low speed or zero. However, in a case where the first HDD 123F is in the non-power saving state ("operating state" hereinbelow), the rotational speed of the disk in the first HDD 123F is a high speed to ensure that data may be read from and written to the first HDD 123F. Hereinbelow, a normal LU 125N that is based on the first RAID group 121F which has a first HDD 123F in the power saving state will be called a "power saving LU", and a normal LU 125N based on the first RAID group 121F which has a first HDD 123F in the operating state will be called an "operating LU". Note that in a case where the physical storage device (PDEV hereinbelow) is not a drive with a disk such as a hard disk or a DVD (where the physical storage device is a flash memory, for example), it may be assumed that when the PDEV is in a power saving state, the power source of the PDEV is in an OFF state, and when the PDEV is in an operating state, the power source of the PDEV is in an ON state.

The second RAID group 121S is a RAID group based on a power saving pool 125P. The term "power saving pool" here is an LU that stores apart of the plurality of data elements that are stored in one or more normal LU 125N. The power saving pool 125P is not supplied to the host apparatus 101, and therefore cannot be designated by an I/O command from the host apparatus 101. The unit areas that the power saving pool 125P comprises will each be referred to hereinbelow as "pool areas". None of the second HDD 123S is placed in a power saving state while the storage system 103 is operating. The second RAID group 121S stores configuration information 151 that is used by the controller 111. The configuration information 151 is information relating to the configuration of the storage system 103, and includes, for example, information indicating which first HDD 123F forms a certain first RAID group 121F, and information indicating which first RAID group 121F a certain normal LU 125N is based on.

Note that the LU, formed based on the second RAID group 121S, may have a normal LU 125N in addition to the power saving pool 125P.

The controller 111 includes a host interface device (host I/F) 113, a data transfer circuit 135, a cache memory 131, a disk interface device (disk I/F) 137, a CPU (Central Processing Unit) 139, and a control memory 141.

The host I/F 123, the CPU 139, the cache memory 131, and the disk I/F 137 are connected to one another via the data transfer circuit 135. The control memory 141 is connected to the CPU 139.

The disk I/F 137 is an interface device for controlling communications with each of the HDDs 123.

The host I/F 123 is an interface device for controlling communications with the host apparatus 101. The host I/F 123 receives I/O commands from the host apparatus 101, and transfers the received I/O commands to the CPU 139. In a case where the host I/F 111 receives a result of processing an I/O command received from the host apparatus 101 from the CPU 139, the host I/F 111 sends a response including the processing result to the host apparatus 101.

The cache memory 131 temporarily stores a data element (write target data element) that is associated with a write command from the host apparatus 101, or a data element (read target data element) that is read from a normal LU 125N or a power saving pool 125P in accordance with a read command from the host apparatus 101. The write target data element stored in the cache memory 131 is stored in the first RAID group 121F on which the normal LU 125N is based, and the read target data element stored in the cache memory 131 is sent to the host apparatus 101.

The control memory 141 stores the configuration information 151 and the I/O control program 153.

The configuration information 151 is information relating to the configuration of the storage system 103, as mentioned earlier. The CPU 139 stores the configuration information 153 in the second RAID group.

The I/O control program 153 is a computer program that causes the CPU 139 to execute processing of I/O commands from the host apparatus 101. The I/O control program 153 refers to the configuration information 151 and performs processing of I/O commands received from the host apparatus 101. Further more, the I/O control program 153 performs the processing of (a) to (c) below in a case where the I/O command received from the host apparatus 101 is a read command and where the LU ("read source LU" hereinbelow) specified by the access destination information of the read command is a power saving LU 125N:
 (a) judging whether or not there is a pool area corresponding to a logical area ("read source area" hereinbelow) indicated by the access destination information of the received read command;
 (b) if the result of the judgment in (a) is affirmative, reading a data element that is identical to a data element stored in the read source area (copy of the data element stored in the read source area) from the pool area corresponding to the read source area without spinning up the first HDD 123F in the first RAID group 121F on which the read source LU 125N is based (without canceling the power saving state of the first HDD 123F), and sending the data element thus read to the host apparatus 101;
 (c) If the result of the judgment in (a) is negative, spinning up the first HDD 123F in the first RAID group 121F on which the read source LU 125N is based (cancels the power saving state of the first HDD 123F), reading the data element from the read source area, and sending the data element thus read to the host apparatus 101.

At the issuance of a read command from the host apparatus 101 to the storage system 103, (Event X) to (Event Z) below, for example, exist in addition to the tasks of the AP 155.

Figure 2:
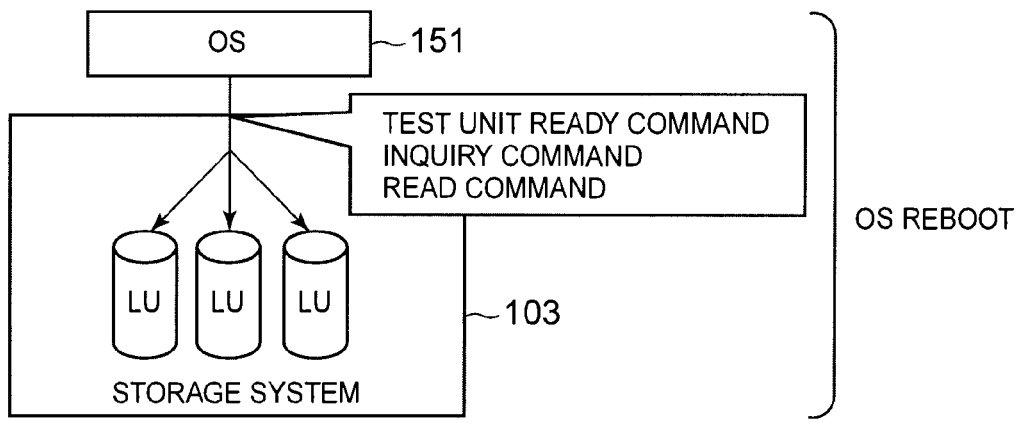
FIG. 2 shows issuance of a read command in response to an OS reboot.

(Event X) Reboot of OS 151. As shown in FIG. 2, a command (test unit ready command) to judge whether or not LUs recognized by the OS 151 during the reboot of the OS 151 are normal, a command (inquiry command) to acquire information relating to the LU (LUN, for example), and a read command to read data elements from the LUs are issued. These commands are issued by the OS 151.

Figure 3:
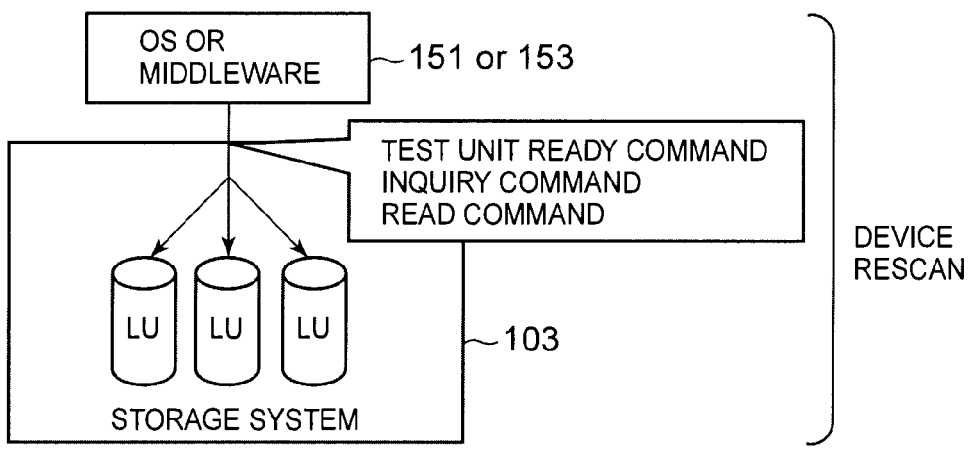
FIG. 3 shows the issuance of a read command in response to a device re-scan.

(Event Y) Device re-scan by the OS 151 or the middleware 153. A device re-scan checks for recognizable LUs without rebooting the OS 151. As shown in FIG. 3, a command (test unit ready command) to judge whether or not LUs recognized in the device re-scan by the OS 151 or the middleware 153 are normal, a command (inquiry command) to acquire information (LUN, for example) relating to the LUs, and a read command to read data elements from the LUs are issued. These commands are issued by the OS 151 or the middleware 153.

Figure 4:
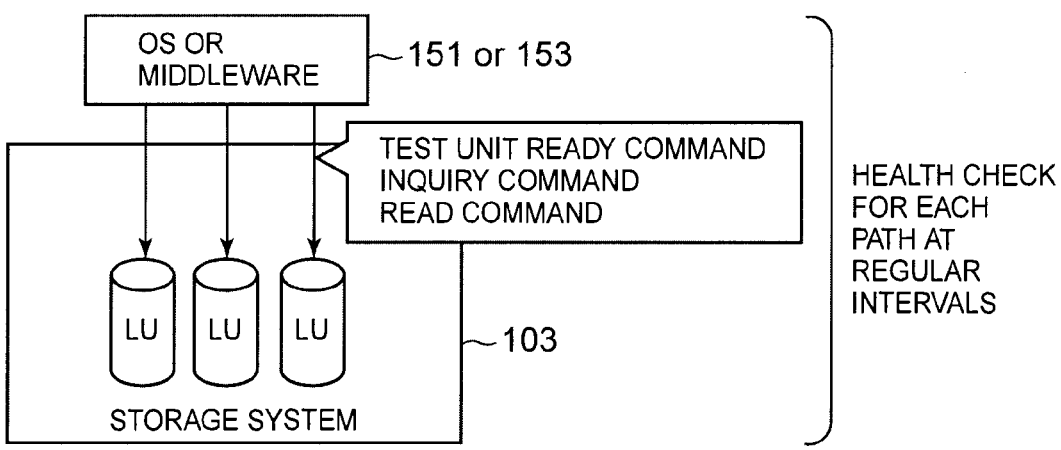
FIG. 4 shows the issuance of a read command in response to a health check.

(Event Z) Health check by the OS 151 or the middleware 153. A health check checks whether or not a path (or LU) recognized by the OS 151 or the middleware 153 are normal at regular intervals (once every hour, for example) for each single path (or LU). As shown in FIG. 4, the OS 151 or the middleware 153 issues a command (test unit ready command) to judge whether or not LUs associated with recognized paths are normal, a command (inquiry command) to acquire information relating to the LUs (the LUN, for example), and a read command to read a data element from the LUs at regular intervals (at each check) for a single path (or LU).

The power saving pool 125P stores the mapping information 152, and the mapping information 152 includes a data element.

FIG. 5 shows the configuration of the mapping information 152 (power saving pool 125P).

The mapping information 152 is information indicating correspondence between the pool areas in the power saving pool 125P and the logical areas in the normal LU 125N. In other words, the mapping information 152 shows in which pool area of the power saving pool 125P, a data element stored in a certain logical area of a certain normal LU 125N is stored.

More specifically, for example, the mapping information 152 is a table in which the table rows each correspond to each of the pool areas in the power saving pool. Hence, the first row is a pool area of a leading LBA, and the last row is a pool area of the end LBA. In addition to data elements, the mapping information 152 includes, for each pool area, a logical area corresponding to the pool area, and data element-related attribute information such as a LUN, a priority level, a power saving flag, a read date and time, an LBA, and a size. Consequently, the pool area size as referred to in this embodiment is greater than the size of the logical area of the normal LU 125N in order to allow storage of the attribute information.

The LUN is the LUN of the normal LU 125N, which includes a logical area that corresponds to a pool area (a logical area that stores an original data element (identical data element) of a data element stored in the pool area).

The priority level is the priority level of the data element stored in the pool area.

The power saving flag indicates whether or not the data element stored in the pool area is an identical data element to a data element that is read from a power saving LU 125N. A data element that corresponds to a power saving flag "present" is a data element that is identical to the data element read from the power saving LU 125N, and a data element that corresponds to power saving flag "none" is a data element that is identical to the data element read from the operating LU 125N. Note that it is clear from the priority level whether or not the data element stored in the pool area is a data element identical to the data element read from the power saving LU 125, and therefore the power saving flag is not essential. The priority level may instead be omitted from the provided power saving flag and priority level.

The read date and time denotes the last date and time the data element was read from the pool area. When a data element is stored in the pool area, the date and time that a data element identical to this data element is read from the read source LU is set as the read data and time.

The LBA denotes the LBA of the logical area corresponding to the pool area.

The size denotes the size of the data element stored in the pool area.

The mapping information 152 may be created manually or created automatically. For example, in a case where the CPU 139 receives a setting command to set the mapping information 152 from a management terminal (not shown), the CPU 139 sends information representing a settings screen 160, which is shown in FIG. 6, to the management terminal. The management terminal displays the settings screen 160 based on this information. The settings screen 160 displays the mapping information 152 stored in the power saving pool 125P and a settings method selection tool (a plurality of radio buttons, for example). The administrator uses the settings method selection tool to select any of "automatic", "manual", and "clear". When "automatic" is selected, the mapping information 152 is suitably updated in the course of the read processing flow (described subsequently). When "manual" is selected, the administrator stores a data element that is identical to a data element selected from one or more of the normal LU in the power saving pool 125P, and includes the priority level of the stored data element in the mapping information 152. Thereupon, the attribute information (LUN, LBA) of the data element, which is based on a read-source logical area, may be automatically included in the mapping information 152. When "clear" is selected, various elements of the mapping information 152 are erased (all the fields in the table are blanked, for example). Information indicating the selected setting method is stored in the control memory 141, for example.

In a case where the settings method is "automatic", the priority level is set as follows, for example. That is, among the plurality of data elements stored in the pool area, a data element that is identical to a data element read from the power saving LU 125N (copy of the read data element) has a higher priority level than a data element that is identical to the data element read from the operating LU 125N. Furthermore, among a plurality of data elements that are identical to the plurality of data elements read from the power saving LU, a data element that is identical to the data element read from the power saving LU 125N in (Event Z) above has a higher priority level than a data element that is identical to the data element read from the power saving LU 125N in (Event X) and (Event Y) above. Therefore, in the example in FIG. 5, the priority level "high" denotes the priority level of a data element that is identical to the data element read from the power saving LU 125N in (Event Z) above, priority level "medium" denotes the priority level of a data element that is identical to the data element read from the power saving LU 125N in (Event X) and (Event Y) above, and priority level "low" denotes the priority level of a data element that is identical to the data element read from the operating LU 125N.

The mapping information 152 may be created for each normal LU 125N or may be common to a plurality of normal LU 125N.

Furthermore, in the read control process flow described later, a data element that is identical to a data element stored in the power saving LU 125N may be read from the power saving pool 125P. However, when a data element that is stored in the operating LU 125N is read from the operating LU 125N, a data element is not read from the power saving pool 125P. To perform rapid reading of a target data element from the power saving pool 125P, a high priority-level data element (a data element that is identical to the data element read from the power saving LU) of a single normal LU 125N preferably exists closer to a leading position, in the power saving pool 125P, than a low-priority level data element. In specific terms, for example, the power saving pool 125P may include a power saving pool area group and an operating pool area group for each single normal LU 125N. The power saving pool area group may exist closer to the leading position in the power saving pool than the operating pool area group. The power saving pool area group is a pool area group that includes one or more pool areas storing data elements that are identical to the data elements read from the power saving LU 125N. The operating pool area group is a pool area group that includes one or more pool areas storing data elements that are identical to the data elements read from the operating LU 125N.

Figure 7:
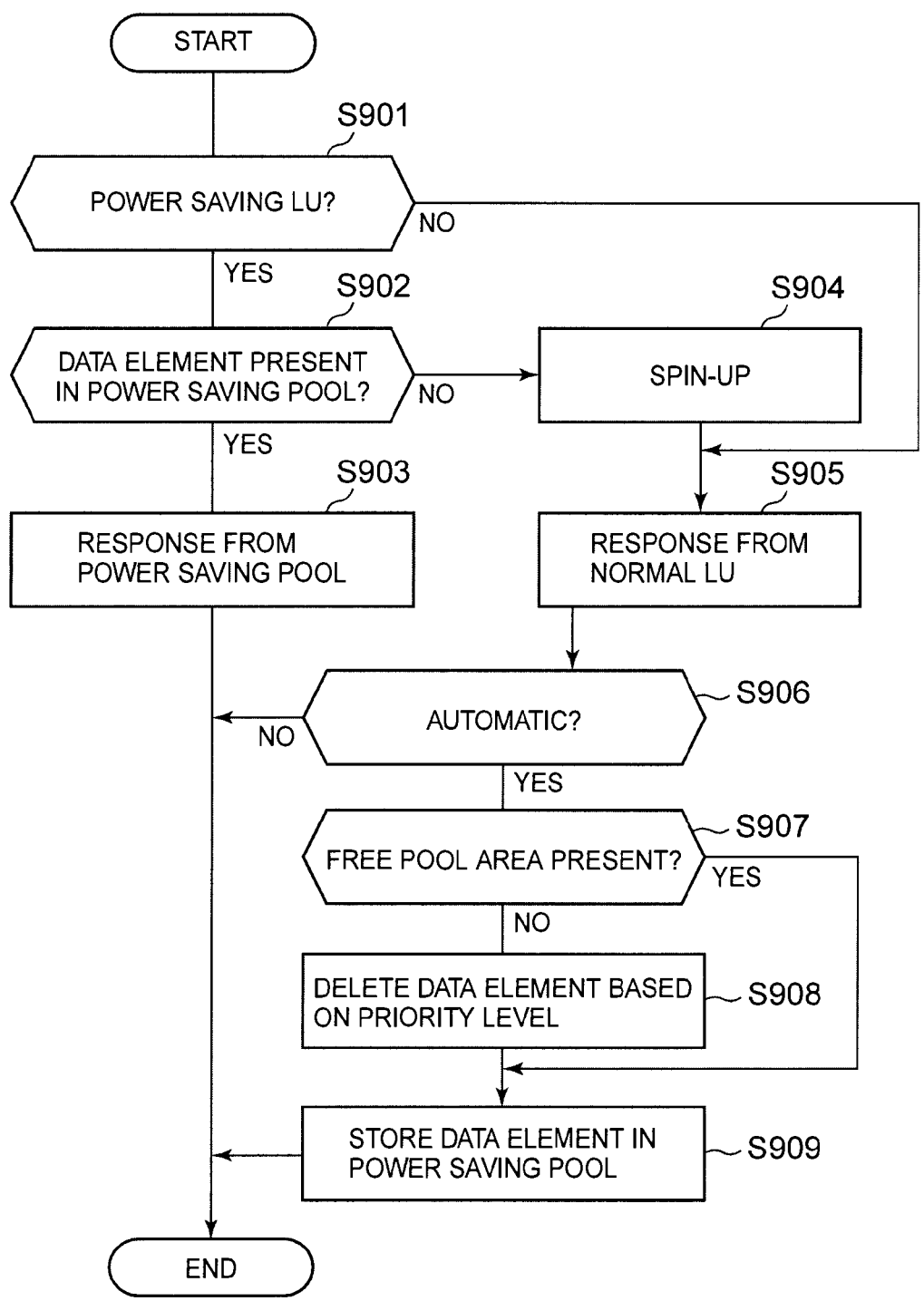
FIG. 7 shows the read control process flow.

FIG. 7 shows the read control process flow.

The read control process flow is a processing sequence performed when a read command is received.

The I/O control program 153 judges whether or not a normal LU 125N (read source LU 125N) specified by the access destination information of the received read command is a power saving LU (S901). It can be judged whether or not the read source LU 125N is a power saving LU by referring to information, in the configuration information 151, which indicates the status of each HDD of the RAID group that corresponds to the read source LU, for example.

If the judgment result of S901 is affirmative (S901: YES), the I/O control program 153 judges, by referring to the mapping information 152, whether or not a data element that is identical to the data element stored in a logical area (read source area) specified by the abovementioned access destination information of the read command has been stored (S902). The judgment result of S902 is affirmative in cases where the LBA of the read source area is included in the mapping information 152.

Figure 8:
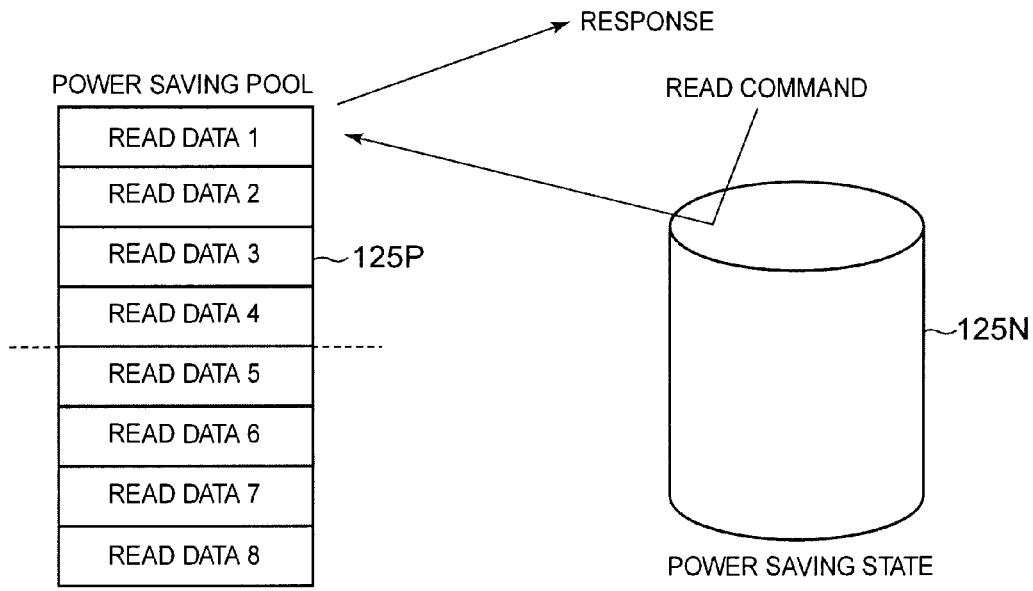
FIG. 8 is an overview of S903 of FIG. 7.

In a case where the judgment result of S902 is affirmative (S902: YES), the I/O control program 153 reads a data element, which is identical to the data element stored in the read source area, from a pool area that corresponds to the read source area without spinning up the first HDD 123F (without canceling the power saving state of the first HDD 123F) in the first RAID group 121F on which the read source LU 125N is based, and sends the read data element to the host apparatus 101 (S903). A summary of S903 is shown in FIG. 8. According to FIG. 8, a data element is not read from the read source area of the power saving LU (read source LU) 125N, a data element is read from the pool area corresponding to the read source area, and the data element thus read is sent to the host apparatus. Note that, in S903, the I/O control program 153 updates the read date and time in the data element read-source pool area to the date and time that is read in S903.

In a case where the judgment result of S902 is negative (S902: NO), the I/O control program 153 spins up the first HDD 123F in the first RAID group 121F on which the read source LU 125N is based (S904). After the rotational speed of the disks of each of the first HDD 123F have been raised to a high speed sufficient to allow data to be read and written, the I/O control program 153 reads data elements from the read source area in the read source LU (normal LU placed in an operating state) 125N, and sends the data elements thus read to the host apparatus 101 (S905).

If the judgment result of S901 is negative (S901: NO), the I/O control program 153 performs S905. Here, the I/O control program reads data elements from the read source area in the read source LU (operating LU) 125N, and sends the data elements thus read to the host apparatus 101.

Following S905, the I/O control program 153 judges whether or not "automatic" has been set as the setting method (S906).

In a case where the judgment result of S906 is affirmative (S906: YES), the I/O control program 153 judges whether or not free pool areas exist in the power saving pool 125P in a number equal to or greater than the number of data elements read in S905 (S907). The term "free pool areas" referred to here denotes pool areas in which a data element has not been stored.

In a case where the judgment result of S907 is negative (S907: NO), the I/O control program 153 determines the data elements to be deleted from the power saving pool 125P on the basis of priority level (and read date and time) in the mapping information 152, and deletes the data elements thus determined (S908). Here, the lower the priority-level of a data element, the greater the priority assigned to its deletion. Where data elements of the same priority level are concerned, the deletion of data elements with an older date and time is prioritized. S909 is therefore carried out after securing free pool areas in the power saving pool 125P in a number equal to or greater than the number of data elements read in S905.

Furthermore, in S909, the I/O control program 153 stores data elements that are identical to the data elements read in S905 in the free pool areas. In so doing, the I/O control program 153 stores, in the pool areas, the LBA and the LUN of the read-source areas of the data elements read in S905. In addition, the I/O control program 153 sets a higher priority level for a data element that is stored in the pool area after performing S904 than for a data element that is stored in the pool area without performing S904. Furthermore, the I/O control program 153 sets a higher priority level for a data element that is identical to a data element read in (Event Z) above than for a data element that is identical to a data element read in (Event X) and (Event Y) above, even when the former data element is stored in the pool area after performing S904.

The read control process flow was described hereinabove.

Figure 9:
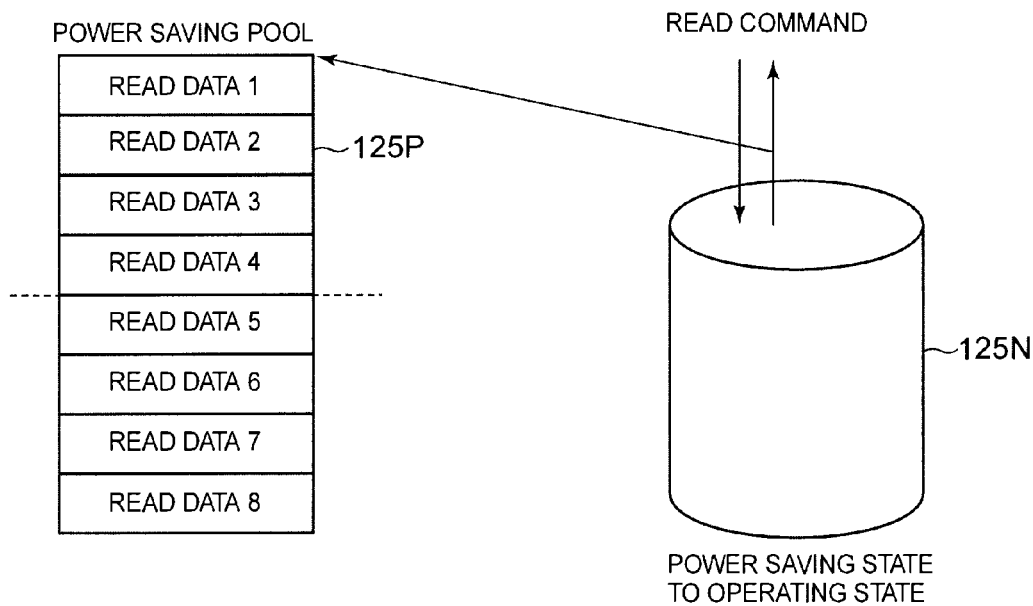
FIG. 9 provides a summary of S904, S905, and S909 in FIG. 7.

A summary of S904, S905, and S909 is shown in FIG. 9. According to FIG. 9, after the read source LU 125N has been shifted to the operating state from the power saving state, data elements are read from the read source LU 125N and the data elements thus read are sent to the host apparatus 101. Furthermore, data elements that are identical to these data elements are stored in free pool areas.

Figure 10:
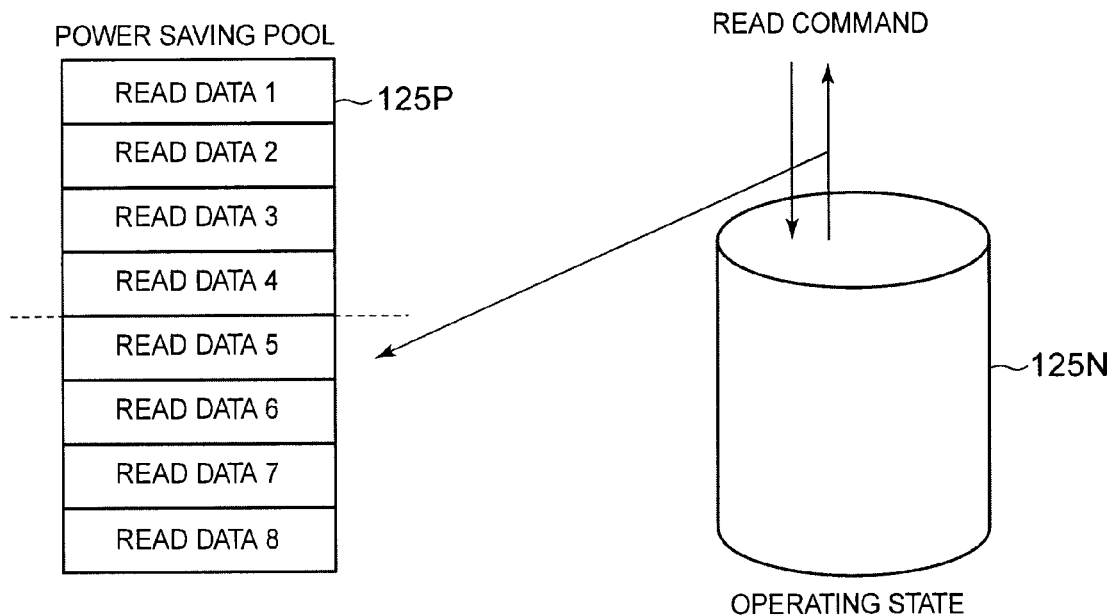
FIG. 10 provides a summary of S905 and S909 in a case where S904 in FIG. 7 is not performed.

A summary of S905 and S909 in a case where S904 is not performed is shown in FIG. 10. According to FIG. 10, data elements are read from the read source LU 125N, which is an operating LU, and the data elements thus read are sent to the host apparatus 101. Furthermore, data elements that are identical to the data elements are stored in a free pool area.

Note that, data elements may be re-arranged at the S908 stage or as processing that is independent of the read control process flow. As a result, higher priority-level data elements (when priority levels are the same, data elements with a read date and time closer to the current date and time) can be stored in pool areas closer to the leading position in the power saving pool. For example, at the S908 stage, among the data elements of the same priority level as the deleted data element, a data element that is stored in the pool area closest to the leading position in the power saving pool 125P is shifted to a free pool area, and therefore a pool area as close as possible to the leading position in the power saving pool 125P may be adopted as the free pool area.

Figure 11:
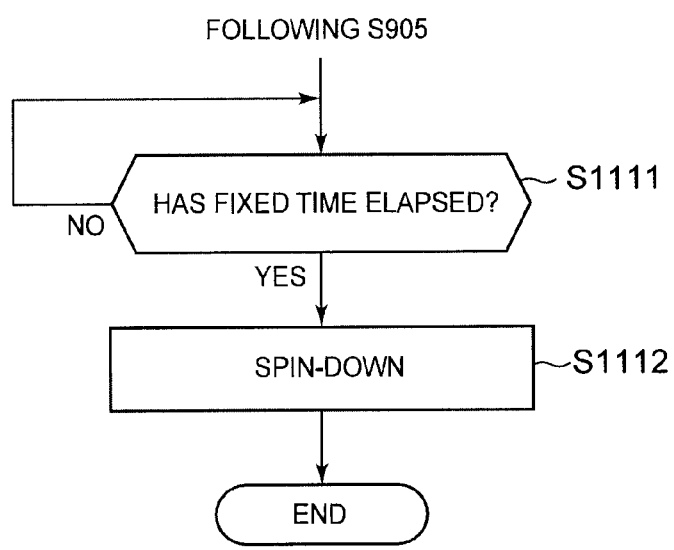
FIG. 11 shows an example of the process flow until spin-down of a first HDD which has been spun up.

Furthermore, the first HDD 123F that is spun down in S904 may also be spun down immediately after S905 (that is, the first HDD 123F for which the power saving state has been cancelled may also be placed once again in the power saving state). Alternatively, as shown in FIG. 11, in cases where a fixed time has elapsed since the most recent step S905 (data element reading) or since the most recent data element writing (S1111: YES) with respect to the first HDD that was spun up in S904, the I/O control program 153 may spin down the first HDD 123F that was spun up in S904.

According to this embodiment as described earlier, a data element that is identical to a part of the plurality of data elements stored in the normal LU 125N is stored in the power saving pool 125P. If the read source LU designated by a read command that is received from the host apparatus 101 is a power saving LU and a data element that is identical to the data element stored in the logical area designated by the read command is stored in the power saving pool 125P, the controller 111 reads this identical data element from the power saving pool without cancelling the power saving state of the first HDD 123F on which the read source LU is based, and sends the read data element to the host apparatus 101. Hence, even if it is a specification of the storage system 103 to respond to the host apparatus 101 with respect to a read command issued on the occasion of any of (Event X) to (Event Z) above (even if a read target data element is sent to the host apparatus 101), there is a reduction in the frequency with which the power saving state of the first HDD 123F is canceled.

INDUSTRIAL APPLICABILITY

An embodiment of the present invention was described hereinabove, but the present invention is not limited to this embodiment. It will be apparent that various changes may be made without departing from the spirit and scope of the invention.

For example, the power saving pool (mapping information 152) may also be provided in the memory in the controller 111 (for example, the control memory 141 or the cache memory 131).

Furthermore, the storage system 103 may also be a storage system that stores only read-only data (archive data, for example).

In addition, the power saving pool 125P may store not only data elements that are identical to data elements that are read in response to a read command, but also data elements that are identical to data elements that are written to a normal LU in response to a write command.

REFERENCE SIGNS LIST

103 Storage system

The invention claimed is:

1. A storage system, comprising:
   a first physical storage device group that stores data elements stored in a logical area of a logical storage device that comprises a plurality of logical areas;
   a second physical storage device group that stores data elements stored in a pool area of a pool that comprises a plurality of pool areas; and a controller which is coupled to the first and second physical storage device groups and which receives, from a host apparatus, a read command to read a data element from any logical area among the plurality of logical areas of the logical storage device, wherein the first physical storage device group comprises one or more first physical storage devices configured to be placed in a power saving state in periods when the controller is capable of receiving the read command, the second physical storage device group comprises one or more second physical storage devices that is not placed in a power saving state in the periods when the controller is capable of receiving the read command, each of the pool areas is a storage area in which a data element is stored, and the pool is a storage area group that comprises the plurality of pool areas, and the pool stores data elements that are identical to data elements stored in a part of the plurality of logical areas, and wherein the controller:

(A) receives the read command from the host apparatus, (B) judges whether or not the one or more first physical storage devices, which store data elements stored in a read-source logical area which is a logical area in accordance with the read command received in the (A), is in a power saving state, (C) in a case where the result of the judgment in the (B) is affirmative, judges whether or not a data element that is identical to the data element stored in the read-source logical area is stored in the pool, (D) in a case where the result of the judgment of the (C) is negative, cancels the power saving state of the one or more first physical storage devices, reads the data element stored in the read-source logical area from the logical storage device, and sends the read data element to the host apparatus, (E) in a case where the result of the judgment of the (C) is affirmative, reads the data element that is identical to the data element stored in the read-source logical area from the pool without canceling the power saving state of the one or more first physical storage devices, and sends the read data element to the host apparatus, and (F) after the (D), places the one or more first physical storage devices in a power saving state;

wherein the read command, which is received by the controller when the one or more first physical storage devices are in a power saving state, is a read command that is issued by the host apparatus at any one of the following events (X) to (Z):

(X) when an operating system (OS) of the host apparatus reboots;

(Y) when the OS or middleware of the host apparatus performs a device re-scan to recognize the logical storage device; and (Z) when the OS or middleware of the host apparatus performs a health check to check the state of the logical storage device or of a path to the logical storage device, the health check is performed at regular intervals and therefore the controller receives the read command issued in the (Z) at regular intervals, and in a case where there is no free pool area in the pool, the controller prioritizes deletion from the pool of a data element in accordance with the read command received in the events (X) and (Y) over deletion of a data element in accordance with the read command received in the event (Z).

2. The storage system according to claim 1, wherein each of the physical storage devices is a hard disk drive, the first physical storage device group is a first RAID group, the second physical storage device group is a second RAID group, the controller reads data elements from the first RAID group on the basis of configuration information which is information relating to a configuration of the first RAID group, the configuration information includes information indicating which of the one or more first physical storage devices forms the first RAID group, the configuration information is stored in the second RAID group, there exists a single pool for a plurality of logical storage devices, the controller manages mapping information indicating in which pool area of the plurality of pool areas, a data element stored in a logical area of a certain logical block address is stored, the controller stores the data element read in the (E) in any free pool area of the plurality of pool areas of the pool, and updates the mapping information to information that includes information indicating correspondence between the pool area which is a storage destination of the data element, and the read-source logical area, and wherein the controller, (G) in a case where the result of the judgment of the (B) is negative, reads the data element stored in the read-source logical area from the logical storage device, sends the read data element to the host apparatus, stores the read data element in any free pool area of the plurality of pool areas of the pool, and updates the mapping information to information that includes information indicating correspondence between the pool area which is a storage destination of the data element, and the read-source logical area, the judgment in the (C) is performed on the basis of the mapping information, and in a case where there is no free pool area in the pool, the controller prioritizes deletion of the data element stored in the (G) from the pool, over deletion of the stored data element read in the (E).

3. The storage system according to claim 1, wherein the controller manages mapping information indicating in which pool area of the plurality of pool areas, a data element stored in a certain logical area is stored, in the (D), the controller stores the read data element in any of the plurality of pool areas of the pool, and updates the mapping information to information that includes information indicating correspondence between the pool area which is a storage destination of the data element, and the read-source logical area, and the judgment in the (C) is performed on the basis of the mapping information.

4. The storage system according to claim 1, wherein the controller:

(G) in a case where the result of the judgment of the (B) is negative, reads the data element stored in the read-source logical area from the logical storage device, sends the read data element to the host apparatus, and stores the read data element in any free pool area of the plurality of pool areas of the pool.

5. The storage system according to claim 4,
wherein in a case where there is no free pool area in the pool, the controller prioritizes deletion of the data element stored in the (G) from the pool over deletion of the data element read in the (E).

6. The storage system according to claim 4,
wherein each of the first physical storage devices is a hard disk drive, and
in the pool, the data element that is read in the (E) is stored in a pool area closer to a leading position in the pool than the data element stored in the (G).

7. A storage control method of a storage system that includes a first physical storage device group that comprises one or more first physical storage devices and a second physical storage device group that comprises one or more second physical storage devices,
the method comprising:
(A) receiving, from a host apparatus, a read command to read a data element from any logical area among a plurality of logical areas of a logical storage device,
(B) judging whether or not the one or more first physical storage devices, which store data elements stored in a read-source logical area which is a logical area in accordance with the read command received in the (A), is in a power saving state,
(C) judging, in a case where the result of the judgment in the (B) is affirmative, whether or not a data element that is identical to the data element stored in the read-source logical area is stored in a pool that stores data elements stored by the one or more second physical storage devices that is not placed in a power saving state in periods when a read command can be received,
(D) in a case where the result of the judgment of the (C) is negative, canceling the power saving state of the one or more first physical storage devices, reading the data element stored in the read-source logical area from the logical storage device, and sending the read data element to the host apparatus,
(E) in a case where the result of the judgment of the (C) is affirmative, reading the data element that is identical to the data element stored in the read-source logical area from the pool without canceling the power saving state of the one or more first physical storage devices, and sending the read data element to the host apparatus, and
(F) placing the one or more first physical storage devices in a power saving state after the (D);
wherein the read command, which is received when the one or more first physical storage devices are in a power saving state, is a read command that is issued by the host apparatus at any one of the following events (X) to (Z):
(X) when an operating system (OS) of the host apparatus reboots;
(Y) when the OS or middleware of the host apparatus performs a device re-scan to recognize the logical storage device; and
(Z) when the OS or middleware of the host apparatus performs a health check to check the state of the logical storage device or of a path to the logical storage device,
the health check is performed at regular intervals and therefore the received read command is issued in the (Z) at regular intervals, and
in a case where there is no free pool area in the pool, prioritizing deletion from the pool of a data element in accordance with the read command received in the events (X) and (Y) over deletion of a data element in accordance with the read command received in the event (Z).

8. The storage control method according to claim 7, further comprising:
wherein each of the physical storage devices is a hard disk drive,
wherein the first physical storage device group is a first RAID group,
wherein the second physical storage device group is a second RAID group,
reading data elements from the first RAID group on the basis of configuration information which is information relating to a configuration of the first RAID group,
wherein the configuration information includes information indicating which of the one or more first physical storage devices forms the first RAID group,
wherein the configuration information is stored in the second RAID group,
wherein there exists a single pool for a plurality of logical storage devices,
managing mapping information indicating in which pool area of the plurality of pool areas a data element stored in a logical area of a certain logical block address is stored,
storing the data element read in the (E) in any free pool area of the plurality of pool areas of the pool, and updates the mapping information to information that includes information indicating correspondence between the pool area which is a storage destination of the data element, and the read-source logical area, and
(G) in a case where the result of the judgment of the (B) is negative, reading the data element stored in the read-source logical area from the logical storage device, sending the read data element to the host apparatus, storing the read data element in any free pool area of the plurality of pool areas of the pool, and updating the mapping information to information that includes information indicating correspondence between the pool area which is a storage destination of the data element, and the read-source logical area,
wherein the judgment in the (C) is performed on the basis of the mapping information, and
in a case where there is no free pool area in the pool, prioritizing deletion of the data element stored in the (G) from the pool, over deletion of the stored data element read in the (E).

9. The storage control method according to claim 7, further comprising:
managing mapping information indicating in which pool area of the plurality of pool areas, a data element stored in a certain logical area is stored,
in the (D), storing the read data element in any of the plurality of pool areas of the pool, and updating the mapping information to information that includes information indicating correspondence between the pool area which is a storage destination of the data element, and the read-source logical area, and
the judgment in the (C) is performed on the basis of the mapping information.

10. The storage control method according to claim 7, further comprising:
(G) in a case where the result of the judgment of the (B) is negative, reading the data element stored in the read-source logical area from the logical storage device, sending the read data element to the host apparatus, and storing the read data element in any free pool area of the plurality of pool areas of the pool.

11. The storage control method according to claim 10, further comprising:
in a case where there is no free pool area in the pool, prioritizing deletion of the data element stored in the (G) from the pool over deletion of the data element read in the (E).

12. The storage control method according to claim 10,
wherein each of the first physical storage devices is a hard disk drive, and
in the pool, the data element that is read in the (E) is stored in a pool area closer to a leading position in the pool than the data element stored in the (G).

13. A storage system, comprising:
a first physical storage device group that stores data elements stored in a logical area of a logical storage device that comprises a plurality of logical areas;
a second physical storage device group that stores data elements stored in a pool area of a pool that comprises a plurality of pool areas; and
a controller which is coupled to the first and second physical storage device groups and which receives, from a host apparatus, a read command to read a data element from any logical area among the plurality of logical areas of the logical storage device,
wherein the first physical storage device group comprises one or more first physical storage devices configured to be placed in a power saving state in periods when the controller is capable of receiving the read command,
the second physical storage device group comprises one or more second physical storage devices that is not placed in a power saving state in the periods when the controller is capable of receiving the read command,
each of the pool areas is a storage area in which a data element is stored, and the pool is a storage area group that comprises the plurality of pool areas, and
the pool stores data elements that are identical to data elements stored in a part of the plurality of logical areas, and
wherein the controller:
(A) receives the read command from the host apparatus,
(B) judges whether or not the one or more first physical storage devices, which store data elements stored in a read-source logical area which is a logical area in accordance with the read command received in the (A), is in a power saving state,
(C) in a case where the result of the judgment in the (B) is affirmative, judges whether or not a data element that is identical to the data element stored in the read-source logical area is stored in the pool,
(D) in a case where the result of the judgment of the (C) is negative, cancels the power saving state of the one or more first physical storage devices, reads the data element stored in the read-source logical area from the logical storage device, and sends the read data element to the host apparatus,
(E) in a case where the result of the judgment of the (C) is affirmative, reads the data element that is identical to the data element stored in the read-source logical area from the pool without canceling the power saving state of the one or more first physical storage devices, and sends the read data element to the host apparatus,
(F) after the (D), places the one or more first physical storage devices in a power saving state;
wherein each of the physical storage devices is a hard disk drive,
the first physical storage device group is a first RAID group, the second physical storage device group is a second RAID group,
the controller reads data elements from the first RAID group on the basis of configuration information which is information relating to a configuration of the first RAID group,
the configuration information includes information indicating which of the one or more first physical storage devices forms the first RAID group,
the configuration information is stored in the second RAID group,
there exists a single pool for a plurality of logical storage devices,
the controller manages mapping information indicating in which pool area of the plurality of pool areas a data element stored in a logical area of a certain logical block address is stored,
the controller stores the data element read in the (E) in any free pool area of the plurality of pool areas of the pool, and updates the mapping information to information that includes information indicating correspondence between the pool area which is a storage destination of the data element, and the read-source logical area, and
wherein the controller,
(G) in a case where the result of the judgment of the (B) is negative, reads the data element stored in the read-source logical area from the logical storage device, sends the read data element to the host apparatus, stores the read data element in any free pool area of the plurality of pool areas of the pool, and updates the mapping information to information that includes information indicating correspondence between the pool area which is a storage destination of the data element, and the read-source logical area,
the judgment in the (C) is performed on the basis of the mapping information, and in a case where there is no free pool area in the pool, the controller prioritizes deletion of the data element stored in the (G) from the pool, over deletion of the stored data element read in the (E).

14. The storage system according to claim 13,
wherein the read command, which is received by the controller when the one or more first physical storage devices are in a power saving state, is a read command that is issued by the host apparatus at any one of the following events (X) to (Z):
(X) when an operating system (OS) of the host apparatus reboots;
(Y) when the OS or middleware of the host apparatus performs a device re-scan to recognize the logical storage device; and
(Z) when the OS or middleware of the host apparatus performs a health check to check the state of the logical storage device or of a path to the logical storage device,
the health check is performed at regular intervals and therefore the controller receives the read command issued in the (Z) at regular intervals, and
in a case where there is no free pool area in the pool and there is no data element stored in the (G), the controller prioritizes deletion from the pool, among the stored data element read in the (E), of a data element in accordance with the read command received in the events (X) and (Y) over deletion of a data element in accordance with the read command received in the event (Z).

15. The storage system according to claim 13,
wherein the controller manages mapping information indicating in which pool area of the plurality of pool areas, a data element stored in a certain logical area is stored, in the (D), the controller stores the read data element in any of the plurality of pool areas of the pool, and updates the mapping information to information that includes information indicating correspondence between the pool area which is a storage destination of the data element, and the read-source logical area, and the judgment in the (C) is performed on the basis of the mapping information.

16. The storage system according to claim 13, wherein the controller:

(G) in a case where the result of the judgment of the (B) is negative, reads the data element stored in the read-source logical area from the logical storage device, sends the read data element to the host apparatus, and stores the read data element in any free pool area of the plurality of pool areas of the pool.

17. The storage system according to claim 16, wherein in a case where there is no free pool area in the pool, the controller prioritizes deletion of the data element stored in the (G) from the pool over deletion of the data element read in the (E).

18. The storage system according to claim 16, wherein each of the first physical storage devices is a hard disk drive, and in the pool, the data element that is read in the (E) is stored in a pool area closer to a leading position in the pool than the data element stored in the (G).

* * * * *